United States Patent
Lin et al.

(10) Patent No.: US 8,966,428 B2
(45) Date of Patent: Feb. 24, 2015

(54) FIXED-OUTLINE FLOORPLANNING APPROACH FOR MIXED-SIZE MODULES

(71) Applicant: National Cheng Kung University, Tainan (TW)

(72) Inventors: Chia-Min Lin, Tainan (TW); Kai-Chung Chan, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 14/069,713

(22) Filed: Nov. 1, 2013

(65) Prior Publication Data

US 2015/0012901 A1    Jan. 8, 2015

(30) Foreign Application Priority Data

Jul. 5, 2013   (TW) .............................. 102124247 A

(51) Int. Cl.
*G06F 17/50*      (2006.01)

(52) U.S. Cl.
CPC ........ *G06F 17/5072* (2013.01); *G06F 17/5081* (2013.01)
USPC ........... 716/124; 716/122; 716/123; 716/125; 716/132; 703/14

(58) Field of Classification Search
CPC ......................... G06F 17/5072; G06F 17/5081
USPC ............. 716/124, 122, 123, 125, 132; 703/14
See application file for complete search history.

(56) References Cited

U.S. PATENT DOCUMENTS

| | | | | |
|---|---|---|---|---|
| 5,452,239 A | * | 9/1995 | Dai et al. | 703/19 |
| 5,903,902 A | * | 5/1999 | Orr et al. | 715/202 |
| 6,385,757 B1 | * | 5/2002 | Gupta et al. | 716/102 |
| 6,408,428 B1 | * | 6/2002 | Schlansker et al. | 716/104 |
| 6,581,187 B2 | * | 6/2003 | Gupta et al. | 716/103 |
| 6,651,222 B2 | * | 11/2003 | Gupta et al. | 716/102 |
| 6,928,610 B2 | * | 8/2005 | Brintzenhofe et al. | 715/202 |
| 6,931,413 B2 | * | 8/2005 | Burges | 1/1 |
| 7,080,063 B2 | * | 7/2006 | Campos et al. | 1/1 |

(Continued)

OTHER PUBLICATIONS

Aktuna et al., "Device-Level Early Floorplanning Algorithms for RF Circuits", IEEE Transactions on Computer-Aided Design of Integrated Circuits and Systems, vol. 18, No. 4, Apr. 1999, pp. 375-388.*

(Continued)

*Primary Examiner* — Phallaka Kik
(74) *Attorney, Agent, or Firm* — Rosenberg, Klein & Lee

(57) ABSTRACT

A fixed-outline floorplanning approach for mixed-size modules is disclosed. Firstly, evenly distribute mixed-size circuit modules to whole chip area based on different requirements such as wire-length, routability, or thermal in the global distribution stage. To maintain the global distribution result and satisfy the fixed-outline constraint, generate a slicing tree by recursively applying partition algorithm to divide modules distributed in a given region into several sub-regions. Then, to remove overlap between circuit modules and find a best solution, use bottom-up shape curve merging and top-down back tracing procedure to generate a slicing tree. The shape curve for each leaf in the tree is built first by enumerated packing. Then, the curves in the tree are merged iteratively from bottom to top, and feasible solutions in the shape curve of the root node are identified according to the fixed-outline constraint. Finally, the best solution is determined by a top-down back tracing procedure.

8 Claims, 6 Drawing Sheets

(56) References Cited

U.S. PATENT DOCUMENTS

| | | | |
|---|---|---|---|
| 7,089,254 B2* | 8/2006 | Burges | 1/1 |
| 7,146,583 B1* | 12/2006 | Sun et al. | 716/113 |
| 7,174,336 B2* | 2/2007 | Campos et al. | 1/1 |
| 7,174,343 B2* | 2/2007 | Campos et al. | 707/737 |
| 7,174,344 B2* | 2/2007 | Campos et al. | 1/1 |
| 7,461,332 B2* | 12/2008 | Brintzenhofe et al. | 715/205 |
| 7,590,642 B2* | 9/2009 | Campos et al. | 1/1 |
| 7,603,640 B2* | 10/2009 | Lin et al. | 716/125 |
| 7,664,806 B1* | 2/2010 | Koudas et al. | 707/899 |
| 7,672,939 B2* | 3/2010 | Burges | 707/999.005 |
| 7,685,540 B1* | 3/2010 | Madden et al. | 716/135 |
| 7,747,624 B2* | 6/2010 | Campos et al. | 707/737 |
| 7,804,504 B1* | 9/2010 | Agarwal | 345/505 |
| 8,001,146 B2* | 8/2011 | Koudas et al. | 707/781 |
| 8,566,360 B2* | 10/2013 | Chen | 707/794 |
| 8,661,388 B2* | 2/2014 | Chen et al. | 716/118 |
| 8,701,058 B2* | 4/2014 | Zavadsky et al. | 716/104 |
| 8,713,501 B1* | 4/2014 | Le et al. | 716/113 |
| 2002/0120914 A1* | 8/2002 | Gupta et al. | 716/17 |
| 2002/0133784 A1* | 9/2002 | Gupta et al. | 716/1 |
| 2002/0178432 A1* | 11/2002 | Kim et al. | 716/18 |
| 2003/0018949 A1* | 1/2003 | Yoshida | 716/14 |
| 2003/0079177 A1* | 4/2003 | Brintzenhofe et al. | 715/500 |
| 2003/0236787 A1* | 12/2003 | Burges | 707/10 |
| 2005/0165732 A1* | 7/2005 | Burges | 707/1 |
| 2005/0223320 A1* | 10/2005 | Brintzenhofe et al. | 715/517 |
| 2006/0190889 A1* | 8/2006 | Cong et al. | 716/8 |
| 2006/0271512 A1* | 11/2006 | Burges | 707/2 |
| 2007/0094625 A1* | 4/2007 | Ikeda | 716/5 |
| 2007/0157146 A1* | 7/2007 | Chen et al. | 716/10 |
| 2007/0245281 A1* | 10/2007 | Riepe et al. | 716/9 |
| 2008/0155485 A1* | 6/2008 | Lin et al. | 716/7 |
| 2010/0023910 A1* | 1/2010 | Chen et al. | 716/10 |
| 2010/0100552 A1* | 4/2010 | Koudas et al. | 707/742 |
| 2010/0325593 A1* | 12/2010 | Zavadsky et al. | 716/104 |
| 2011/0225561 A1* | 9/2011 | Orita et al. | 716/131 |
| 2012/0197714 A1* | 8/2012 | Beyeler et al. | 705/14.49 |

OTHER PUBLICATIONS

Cheng et al., "Floorplanning for 3-D VLSI Design", ASP-DAC 2005, IEEE, pp. 405-411.*

Fang et al., "A Greedy Approach for Floopanning Mass Modules" 2012, IEEE, pp. 13-16.*

Guo et al., "An O-Tree Representation of Non-Slicing Floorplan and Its Applications", DAC, 1999 ACM, pp. 268-273.*

Lichen et al., "An Efficient Simulated Annealing Based VLSI Floorplanning Algorithm for Slicing Structure", 2012 International Conference on Computer Science and Service System, IEEE, pp. 327-331.*

Dsg et al. "A Bottom up Approach for Placement and Compaction of Standard Modules in VLSI Circuit", 2013 International Conference on Advanced Electronic Sysetms (ICAES), IEEE, pp. 133-137.*

Yonezawa et al. "A VLSI Floorplanner Based on 'Balloon' Expansion", 1990, IEEE, pp. 257-261.*

Young et al., "Slicing Floorplans with Boundary Constraint", 1999, IEEE, pp. 17-20.*

Young et al, "On Extending Slicing Floorplan to Handle L/T-Shaped Modules and Abutment Constraints", IEEE Transactions on Computer-Aided Design of Integrated Circuits and Systems, vol. 20, No. 6, Jun. 2001, pp. 800-807.*

Young et al., "Slicing Floorplans with Boundary Constraints", IEEE Transactions on Computer-Aided Design of Integrated Circuits and Systems, vol. 18, No. 9, Sep. 1999, pp. 1385-1389.*

Young et al., "Slicing Floorplans with Range Constraints", IEEE Transactions on Computer-Aided Design of Integrated Circuits and Systems, vol. 19, No. 2, Feb. 2000, pp. 272-278.*

\* cited by examiner

FIXED-OUTLINE FLOORPLANNING APPROACH FOR MIXED-SIZE MODULES

BACKGROUND OF THE INVENTION

1. Fields of the Invention

The present invention relates to a fixed-outline floorplanning approach for mixed-size modules, especially by means of evenly distributing circuit modules over a chip outline in the global distribution stage based on different requirements, such as wire-length, thermal, routability, performance and so on, and removing the overlap between circuit modules in a legalization stage without violating relative positions of the modules determined in the global distribution results and the fixed-outline constraint, so as to save the wire-length of the chip, enhance the chip performance and shorten the time of IC design flow.

2. Descriptions of Related Art

Floorplanning, which determines the shapes and locations of modules in a chip, is an important step in VLSI design, and chip performance is deeply affected by the results. In order to reduce design complexity, hierarchical designs are widely applied approaches on SoCs, which makes floorplanning more important than ever. Since a good floorplanning usually leads to a better distribution of module locations, total routing length can be reduced, which not only enhances the chip performance, but also significantly shorten the time to market for ICs design.

The properties of analog and digital modules are different. Since a digital module is usually made by automatic distributed winding tools, it is called a soft module, in which the aspect ratio of the shape of the module is able to be changed on the premise of area unchanged. However, a hard module generally refers to a custom design module such as an analog circuit module. Because it is manually drafted by engineers, its aspect ratio cannot be changed. Currently, engineers still have to complete floorplanning semi-manually by use of a prevailing tool SoC Encounter in the industry, which is greatly relied on layout designers' experiences and wisdom. In other words, full automation in this regard is not available.

In previous researches, most of them apply the simulated annealing algorithm to handle floorplanning. Because the simulated annealing algorithm is non-deterministic, it not only takes longer execution time, but also obtains different results in each time.

Recently, Yan and Chu proposed a floorplanning approach (DeFer: Deferred decision making enable fixed-outline floorplanner, In Proc. DAC, pp. 161-166, in 2008), which first build a generalized slicing tree by applying hMetis to partition circuit modules, and then merges curves of nodes in the tree to build a floorplan. Although DeFer is efficient and effective, it has two major disadvantages as follows: (1) it can obtain good result while only wire-length is considered. That is, DeFer is hard to be extended to consider other factors such as thermal and routability, which are important issues in modern designs. (2) It uses a random process in its method which leads to different results each time it is executed.

In order to solve above problems, to optimize several objectives including smaller chip area and shorter routing wire-length under the fixed-outline constraint, and to get the stable results in quick running time, there is room for improvement and a need to provide a novel method.

SUMMARY OF THE INVENTION

Therefore a primary goal of the present invention is to provide a fixed-outline floorplanning approach for mixed-size modules. Using a two-stage approach to handle floorplanning with fixed-outline constraints refers to evenly distributing circuit modules over chip area in a global distribution stage under different requirements, such as wire-length, thermal, routability, performance and so on, and removing overlap between circuit modules in a legalization stage by keeping relative positions of the modules determined in the global distribution stage and satisfy fixed-outline constraints, so as to save the wire-length of the chip, enhance chip performance and shorten design time of IC design flow.

In order to achieve the above objectives, a fixed-outline floorplanning approach for mixed-size modules of the present invention includes the following steps: first evenly distribute circuit modules over whole chip area. Then generate a slicing tree by applying the recursive partition based approach to module positions obtained in the step one, where partitioning stops on a pre-determined condition. Finally, remove overlaps between the circuit modules and find a feasible solution in conformity with the fixed-outline constraints by bottom-up merging of shape curves of nodes in the slicing tree and then top-down back tracing of the same to determine the shapes and locations of the circuit modules, wherein each shape curve is composed of points representing dimensions of possible floorplans. Hence, comparing to the traditional floorplanning using the non-deterministic approach or stochastic procedure, e.g. simulated annealing algorithm, which get different results in each time, above steps which use the deterministic algorithm can obtain stable results in quick time. Moreover, the average wire-length of the invention also is better than that of the existing methods.

Several approaches can be used to distribute circuit modules over whole chip area such as the analytical based approach or force directed approach. The objective function during distributing circuit modules over a given chip region is to optimize wire-length. Furthermore, it can include other factors such as thermal and routability. Accordingly, the method of the present invention is more flexible than DeFer (i.e. DeFer only can consider wire-length because it applies hMetis).

The terminal condition in partitioning is when the number of modules in a leaf node of a slicing tree is smaller than a specified value. The specified value is between 8 and 10, and preferably 9.

Above circuit module further includes a rectilinear module.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
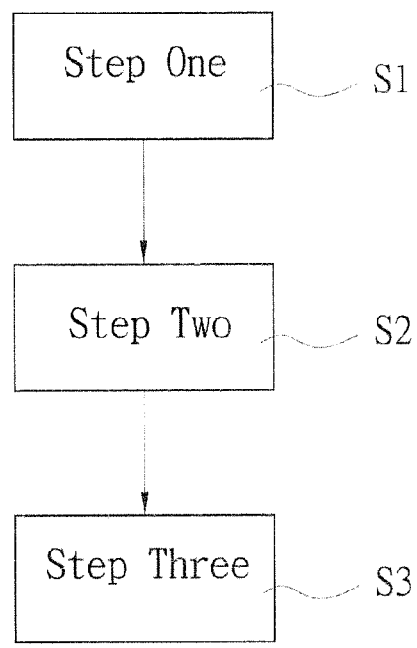
FIG. 1 is a flow chart showing steps of an embodiment of a floorplanning approach for mixed-size modules according to the present invention.

First refer to FIG. 1 for a floorplanning approach for mixed-size modules according to the present invention. It handles fixed-outline driven floorplanning for mixed-size circuit modules which include soft modules and hard modules. A hard module usually refers to a customized module which has fixed width and height (e.g. analog circuit modules), and a soft module denotes a digital module with a fixed area, in which the aspect ratio of its outline can be changed arbitrarily within a predefined range. The floorplanning approach includes following steps.

Step one (S1): evenly distributing circuit modules including hard modules and soft modules over whole chip area, which is called a global distribution stage. The analytical based approach or force directed approach can be applied. The objective of the force directed approach is the curve path with the least consumed energy when optimization of every circuit module placement. The analytical based approach is to compute wire-length with stable-log-sum-exp (S-LSE) model proposed by Kuwan and Takashima in 2010 (Stable-LSE based analytical placement with overlap removable length. In Proc. SASIMI, pp. 115-120). And the congestion of a bin is measured with bell-shape function applied as U.S. Pat. No. 6,301,696 (Non-linear optimization system and method for wire length and delay optimization for an automatic electric placer). These papers and patents are incorporated by reference. The objective function is to optimize wire-length, and it can further include other factors such as thermal, routability, performance or combination thereof. Compare with the DeFer which only considers wire-length, the present invention can add the routability and thermal into the objective function of the analytical approach, so it is more flexible than DeFer. It is worth noting that above analytical approach and force directed approach have been extensively disclosed in the prior art and literature and they are not technical features of the present invention, so they are not repeated. In addition, above mixed-size circuit modules further include rectilinear modules, that is, the outline of the circuit module is the irregular shape constituted by a straight line. After step one, the initial floorplan is obtained; however, the overlap still exists between two circuit modules, and it needs following steps to resolve this problem.

Step two (S2): generating a slicing tree by applying the recursive partition based approach to module positions obtained in the step one (S1), where partitioning stops on a pre-determined condition. It first initializes a node in a slicing tree to represent whole circuit modules in the distribution. If the number of modules in a leaf of the current slicing tree is greater than a specified number, it divides these modules in the region into two sub-regions, and constructs two nodes to represent them and link the two nodes back to the original node. The procedure repeats until the number of modules in each leaf node 2 is smaller than a specified value, where above specified value is between 8 and 10, and preferably 9.

Figure 2:
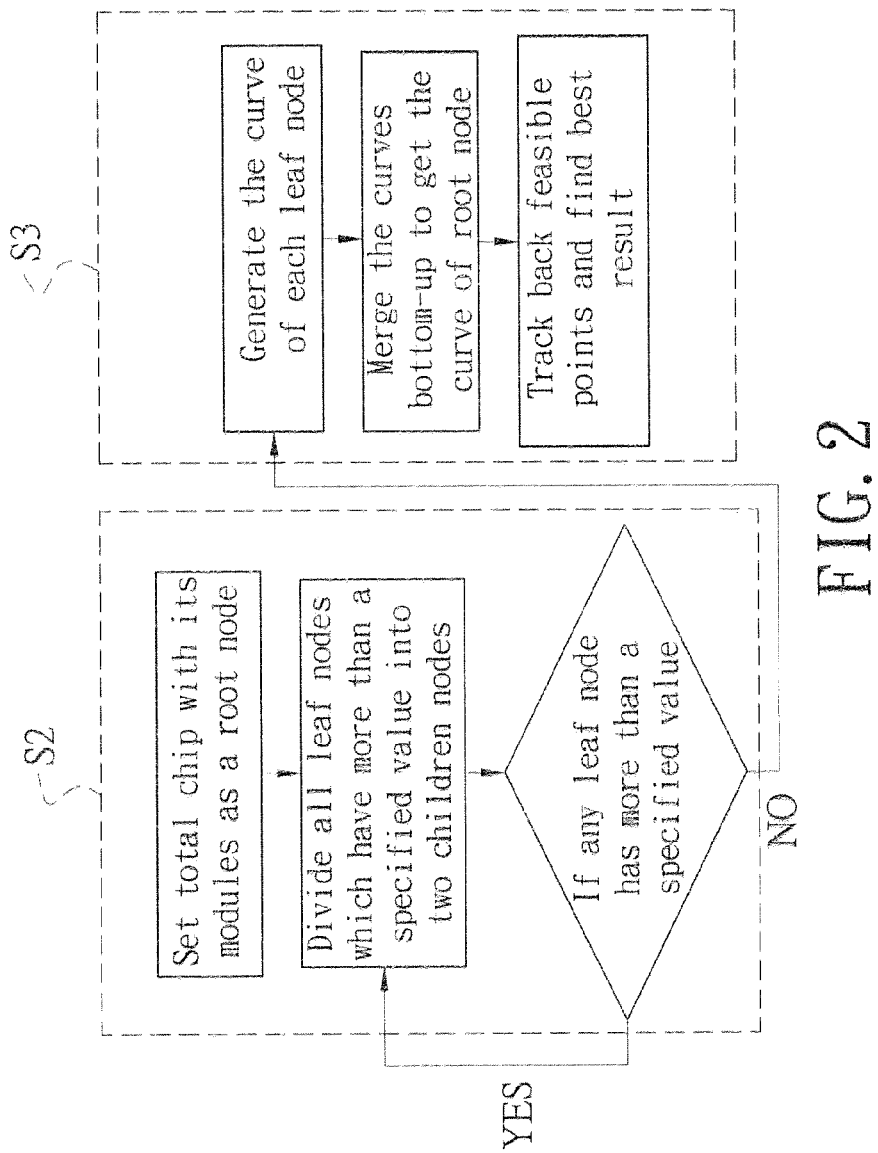
FIG. 2 is a detailed flow chart showing steps of a legalization stage according to the present invention.
Figure 3:
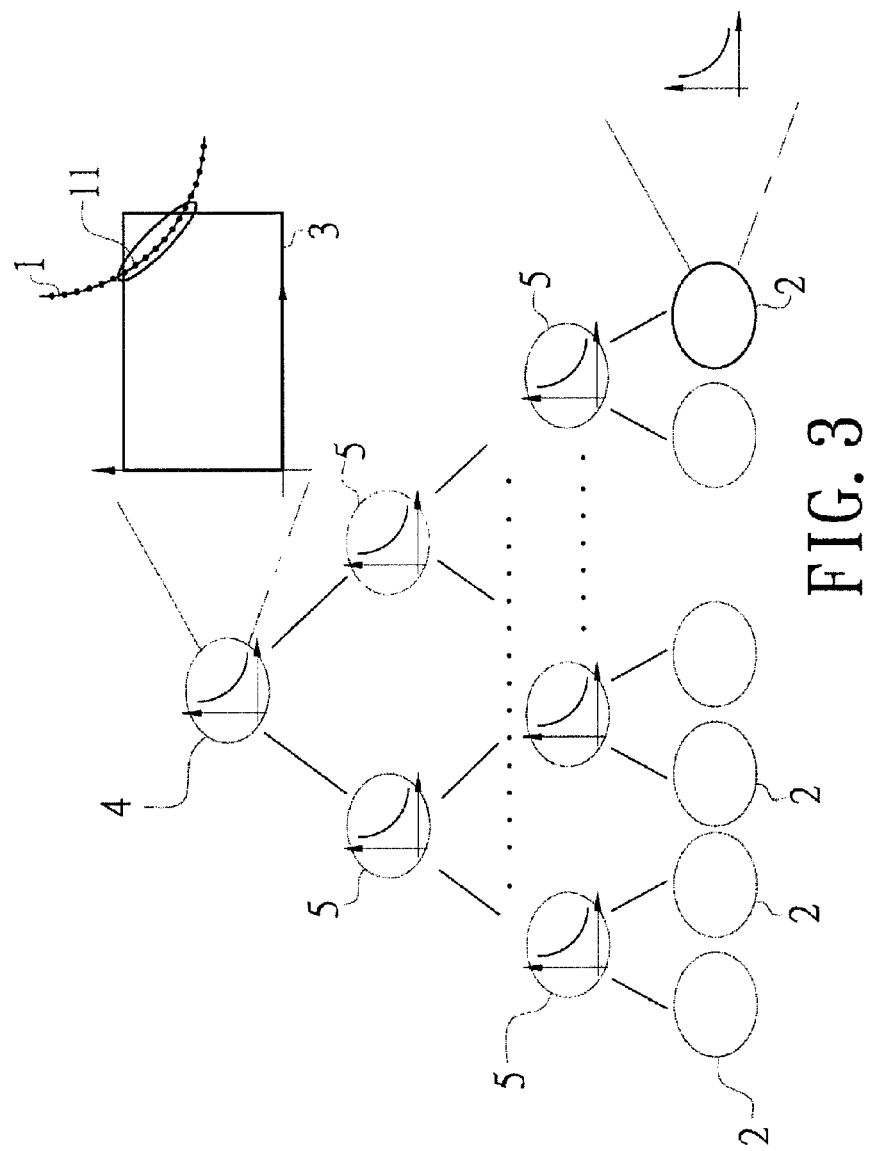
FIG. 3 is a schematic drawing showing a slicing tree generated by a recursive partition based approach according to the present invention.

Step three (S3): removing overlaps between the circuit modules and finding a feasible solution in conformity with the fixed-outline constraints by bottom-up merging of shape curves of nodes in the slicing tree and then top-down back tracing of the same to determine the shapes and locations of the circuit modules, wherein each shape curve is composed of points representing dimensions of possible floorplans. Please also refer to FIG. 3, where a curve 1 formed by each node 11 is the result of merging shape curves 1 of each leaf node 2 in the slicing tree bottom-up. Each point in a curve 1 denotes a dimension of possible floorplan of circuit modules. Then the shapes and locations of the circuit modules are determined by top-clown back tracing of the same. It should be noted that step two (S2) and step three (S3) solve the overlap issue between two circuit modules after a global distribution stage. The process of merging step two (S2) and step three (S3) is called as a legalization stage. Please also refer to FIG. 2, it is a detailed flow chart showing steps of a legalization stage according to the present invention. It is divided into two parts: generating a slicing tree (step two S2), and merging curve and back tracing to find a feasible solution (step three S3). In the part of step two (S2), first regarding the total circuit modules distributed in a chip region as a root node 4 of a slicing tree. If the number of circuit modules associated with the leaf nodes 2 in current tree is greater than a specified value, it divide the modules in the region into two sub-regions, and construct two children nodes 5 to represent the circuit modules in respective sub-regions and link the two nodes back to the original node of the slicing tree. Repeat this step until the number of circuit modules in the leaf nodes 2 is smaller or equal to a specified value, then to enter the step three (S3). The slicing tree is generated after step two (S2) finishes as showing in FIG. 3. First generate the curves of the leaf nodes 2 in a slicing tree, and then merge the curves in the tree from bottom to top to obtain the curve 1 of root nodes 4, where every node 11 of the curve 1 is the possible floorplans of the modules. Finally, feasible solutions in the shape curve of the root are identified according to the fixed-outline constraint. In the root node 4 in the FIG. 3, every point 11 denotes a feasible floorplan which satisfies the fixed-outline constraint 3 in the legalization stage. Finally, the better shapes and locations of modules are determined by a top-down back tracing each node in the tree. Hence, the shapes and locations of the circuit modules are determined automatically in the present invention. It not only solves the issue of enhances traditional semi-manual mode in deciding the locations and shapes of modules in a chip for engineers, but also significantly enhances chip quality in term of wire-length and shorten the overall chip design time.

Figure 4:
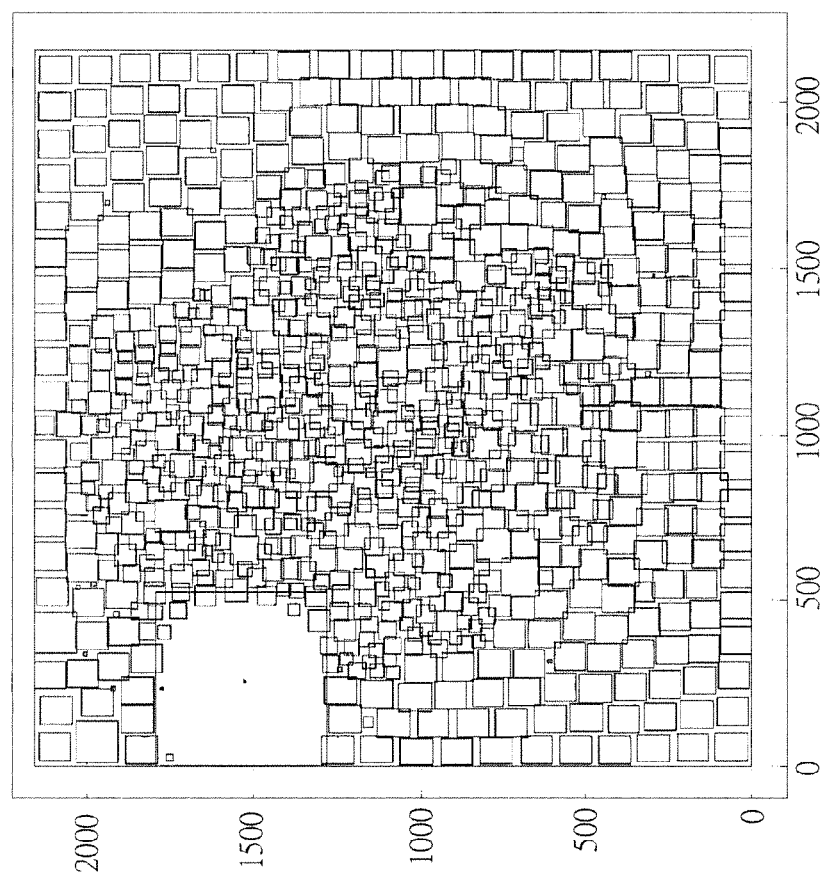
FIG. 4 is a layout of an embodiment for evenly distributing circuit modules at a whole chip according to the present invention.
Figure 5:
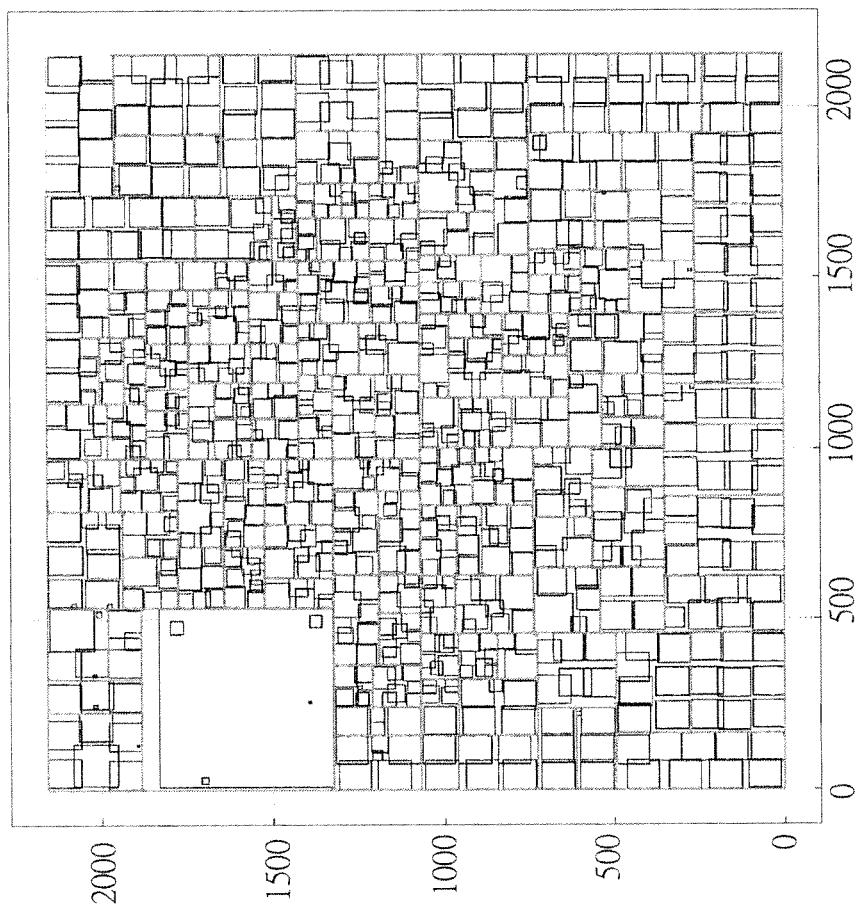
FIG. 5 is a layout of an embodiment finished in step two according to the present invention.
Figure 6:
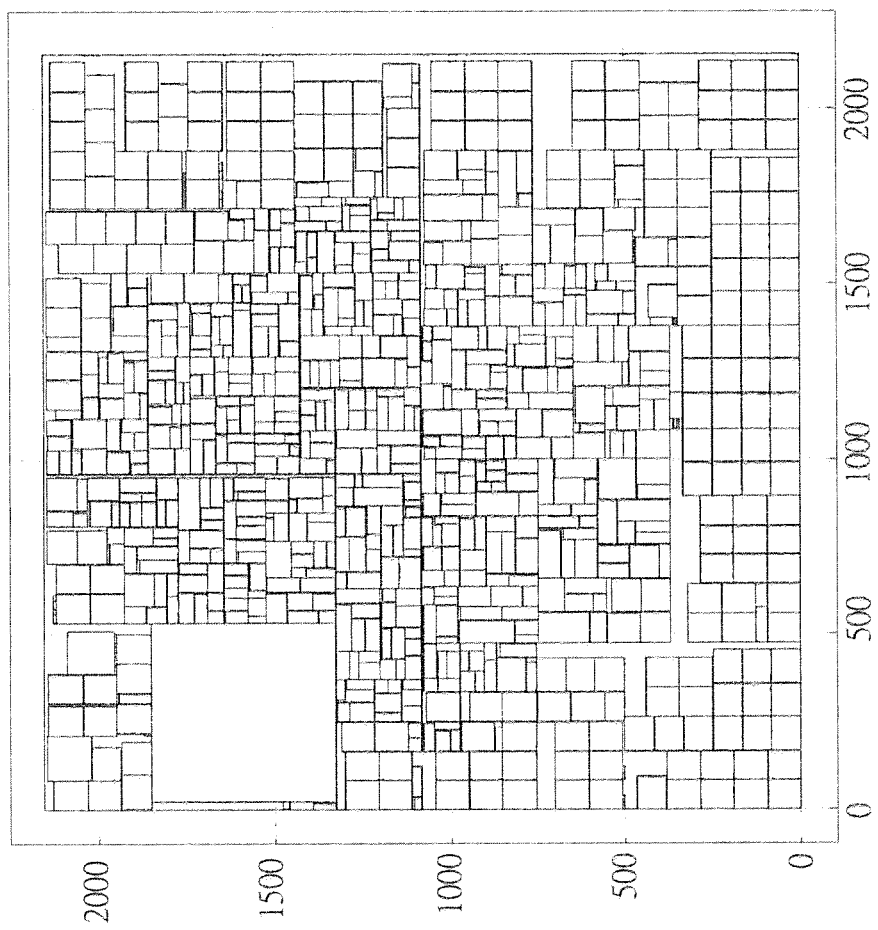
FIG. 6 is a layout of an embodiment finished in step three according to the present invention.

Please refer to FIG. 4, which shows a layout of an embodiment for the distribution of circuit modules in a chip after the global distribution stage of the present invention. The circuit modules have some overlaps after a global distribution. Please also refer to FIG. 5, it is a layout of an embodiment finished in step two (S2) according to the present invention. The region is divided into several subregions by recursively applying bi-partition algorithm to the circuit module distribution, where partition stops until circuit modules in each subregion is smaller or equal to 9, and a slicing tree is built based on the result. FIG. 6 is a layout of an embodiment finished in step three (S3) according to the present invention. The shapes and locations of modules are determined without any overlap by use of bottom-up curve mergence and top-down back tracing to the slicing tree. The experimental result shows that the present invention can averagely reduce wire-length by 22.5% and 4.7% than PATOMA (Fast floor-planning by look ahead enabled recursive bi-partitioning, IEEE TCAD, pp. 1719-1732) and DeFer in mixed size benchmarks.

Compared with techniques available now, the present invention has following advantages:

1. The present invention can solve the issue from the method DeFer since it applies the method of hMetis which can only consider wire-length. Because routability and thermal can be formulated into the objective function of the analytical based approach, the method of the present invention is more flexible than DeFer.

2. The present invention generates a slicing tree based on global distribution results, and uses the method of bottom-up shape curve merging and top-down back tracing to obtain legal placements, and these approach are deterministic algorithm. Comparing with the non-deterministic used in the traditional floor-planning approach with stochastic procedure, e.g. simulated annealing algorithm, which get different results in each time, it can obtain the stable result in quick time. Moreover, the average wire-length is also better than existing methods.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for fabricating an integrated circuit (IC) chip with mixed-size modules, including soft and hard modules under fixed-outline constraints, and comprising computer floorplanning steps of:

step one: evenly distributing circuit modules over whole chip area under the control of a computer;

step two: generating a slicing tree by applying a recursive partition based approach to module positions obtained in the step one, where partitioning stops on a pre-determined condition; and step three: removing overlaps between the circuit modules and finding a feasible solution in conformity with the fixed-outline constraints by bottom-up merging of shape curves of nodes in the slicing tree and then top-down back tracing of the same nodes to determine shapes and locations of the circuit modules, wherein each shape curve is composed of points representing dimensions of possible floorplans for fabricating the IC chips using said computer.

2. The method as claimed in claim 1, wherein the circuit module further includes a rectilinear module.

3. The method as claimed in claim 1, wherein the distribution of the circuit modules over said chip in the step one is done by an analytical based approach and a force directed approach.

4. The method as claimed in claim 3, wherein the analytical based and force directed approaches in distribution of the circuit modules are performed with an objective function of optimization wirelength.

5. The method as claimed in claim 4, wherein the objective function includes a factor of thermal, routability, performance or combination thereof.

6. The method as claimed in claim 1, wherein the recursive partition based approach is based on a bi-partition algorithm.

7. The method as claimed in claim 1, wherein the pre-determined condition for stopping the partition in step two is defined as all leaf nodes smaller than a specified value.

8. The method as claimed in claim 7, wherein the specified value is 9.

* * * * *